United States Patent [19]

Nomura

[11] Patent Number: 4,545,464
[45] Date of Patent: Oct. 8, 1985

[54] APPARATUS FOR CONTROLLING AN A-C POWER ELEVATOR

[75] Inventor: Masami Nomura, Nagoya, Japan

[73] Assignee: Mitsubishi Denki Kabushiki Kaisha, Japan

[21] Appl. No.: 470,955

[22] Filed: Mar. 1, 1983

[30] Foreign Application Priority Data

Mar. 9, 1982 [JP] Japan .................................. 57-37065

[51] Int. Cl.$^4$ .............................................. B66B 5/00
[52] U.S. Cl. ................................ 187/29 R; 187/29 A; 318/762; 318/802; 318/807; 318/810; 363/37; 363/55; 363/61
[58] Field of Search ............... 187/29, 29 R; 318/762, 318/798, 802, 803, 807, 808, 810, 811; 363/37, 55, 61

[56] References Cited

U.S. PATENT DOCUMENTS

| | | | |
|---|---|---|---|
| 4,319,177 | 3/1982 | Kawada et al. | 318/798 |
| 4,353,023 | 10/1982 | Kawada et al. | 318/762 |
| 4,426,610 | 1/1984 | Kawada et al. | 318/798 |
| 4,434,393 | 2/1984 | Kobari et al. | 318/762 X |

FOREIGN PATENT DOCUMENTS

| | | | |
|---|---|---|---|
| 56-132275 | 10/1981 | Japan. | |
| 2111251 | 6/1983 | United Kingdom | 187/29 D |

Primary Examiner—William M. Shoop, Jr.
Assistant Examiner—Shik Luen Paul Ip
Attorney, Agent, or Firm—Leydig, Voit & Mayer, Ltd.

[57] ABSTRACT

An apparatus for controlling an A-C powered elevator in which A-C electric power is converted into D-C electric power through a rectifier, the D-C electric power thus converted is converted into a A-C electric power of a variable frequency via an inverter, an A-C electric motor is driven by the thus converted A-C electric power, the A-C motor being controlled by a controller which is connected to a D-C control source, a cage is driven by the thus controlled electric motor, said motor producing regenerated electric power depending upon the operation condition of said cage, wherein provision is made of a regenerated electric power controlling device which is connected between the D-C side of the inverter and the controller in order to supply the regenerated electric power to the controller. When the voltage on the D-C side of the inverter becomes greater than a predetermined reference value, a switching element is rendered conductive, and the regenerated electric power is supplied to the controller. Therefore, a power regenerating inverter need not be independently provided, and the apparatus can be cheaply constructed. Further, since the electric power is not wastefully consumed, energy can be saved.

10 Claims, 6 Drawing Figures

APPARATUS FOR CONTROLLING AN A-C POWER ELEVATOR

BACKGROUND OF THE INVENTION

The present invention relates to an improved apparatus for controlling an A-C powered elevator.

FIG. 1 illustrates a conventional apparatus which employs an induction motor to drive the cage of an elevator, the induction motor being supplied with an A-C power having a variable voltage and a variable frequency.

In FIG. 1, symbols R, S, T denote a three-phase A-C power source, reference numeral 1 denotes a rectifier, numeral 2 denotes a capacitor for smoothing the D-C output of the rectifier 1, numeral 3 denotes an inverter of the well-known PWM type system which is connected to the D-C side of the rectifier 1 and which converts a constant D-C voltage into an A-C power having a variable voltage and a variable frequency which is controlled by pulsewidth modulation control, numeral 4 denotes a three-phase induction motor powered by the inverter 3, numeral 5 denotes a brake wheel coupled to the motor 4, numeral 6 denotes a brake shoe which comes into engaging and disengaging contact with the periphery of the brake wheel 5 and which applies a braking force when it engages therewith, said brake shoe being forced against said brake wheel by a spring (not shown). Numeral 7 denotes a brake coil, which when energized, pulls the brake shoe 6 away from the brake wheel 5 thereby overcoming the force of said spring, numeral 8 denotes a drive sheave of a hoist which is driven by the electric motor 4, numeral 9 denotes a main rope wound around the sheave 8, numeral 10 denotes a cage connected to the main rope 9, numeral 11 denotes a balance weight, numeral 12 denotes an inverter for regenerating electric power and which is connected between the power source terminals R, S, T and the output side of the rectifier 1, numeral 13 denotes a transformer of which the primary side is connected to the power source R, S, T, numeral 14 denotes a rectifier which is connected to the secondary side of the transformer 13, numeral 15 denotes a start/stop device which is connected to the D-C side of the rectifier 14 and which is utilized to start and stop the cage 10, numeral 16 denotes a brake controller which is connected to the brake coil 7 for the control thereof, numeral 17 denotes a contactor controller, numeral 18 denotes an electromagnetic contactor which is controlled by the contactor controller 17, i.e., which is energized when the cage 10 is to be started and de-energized when the cage 10 is to be stopped, reference numerals 18a to 18c denote normally-open contacts connected to the rectifier 1 on the side of the power source, numeral 19 denotes an electromagnetic contactor which is energized after the electromagnetic contactor 18 is energized and which is de-energized after the electromagnetic contactor 18 is de-energized, reference numerals 19a to 19c denote normally-open contacts connected to the output side of the inverter 3, numeral 20 denotes a speed controller which controls the inverters 3 and 12, and numeral 21 denotes a door controller for opening and closing the door of the cage 10.

The operation of the system is as described herebelow.

When the cage 10 is at rest, the brake shoe 6 is pressing against the brake wheel 5 due to a pressure of a spring (not shown). When the cage 10 is instructed to move, the electromagnetic contactor 18 is energized, which causes the contacts 18a to 18c to close, thereby applying the A-C power source to the rectifier 1 which, in turn, produces a D-C output. Consequently, the capacitor 2 is electrically charged. As the voltage of the capacitor 2 reaches a predetermined value, controls elements (not shown) in the inverter 3 are successively rendered conductive whereby A-C power of a variable voltage and variable frequency is produced maintaining a phase sequence that corresponds to the direction of operation of the elevator. Then, the electromagnetic contactor 19 is energized, which causes contacts 19a to 19c to close, and the A-C power from the inverter 3 to be supplied to the electric motor 4. At the same time, the brake coil 7 is energized, and the brake shoe 6 disengages from the brake wheel 5. Thus, the electric motor 4 rotates in a direction determined by the phase sequence inputted from the speed controller 20 to inverter 3, and the cage 10 commences to operate. The speed controller 20 operates, the output frequency of the inverter 3 is adjusted according to speed instruction signals from the speed controller 20, thereby controlling the running speed of the motor 4, i.e., the running speed of the cage 10 is controlled. The speed can be controlled in a variety of ways; i.e., voltage/frequency constant control method, slip frequency control method, vector control method, and the like. These methods, however, are not described herein.

During the so-called load-raising operation such as when the cage is accelerating in an upward direction with a heavy load or in a downward direction with a light load, the electric power is supplied to the motor 4 via the inverter 3. During the so-called load-lowering operation such as when the cage is decelerating in an upward direction with a light load or in a downward direction with a heavy load, the motor 4 assumes the state of a regenerative operation, and the regenerated electric power flows into the inverter 3 and stored in the capacitor 2. However, during the load-lowering operation the voltage may rise excessively and destroy elements in the inverter 3. Therefore, the power regenerating inverter 12 is utilized for returning the regenerated electric power back to the A-C side thereby protecting the inverter 3.

However, provision of the power regenerating inverter 12 inevitably increases the cost of the system. It has also been attempted to consume the regenerated electric power through resistors. According to this method, however, the electric power is wastefully consumed, which is not desirable from the standpoint of saving energy.

SUMMARY OF THE INVENTION

The present invention improves the above-mentioned drawbacks and has as its object to provide an apparatus for controlling an A-C power elevator, which is cheap to construct and which is energy efficient, by supplying the electric power regenerated on the D-C side of inverter which is connected to the electric motor, to the apparatus which controls the electric motor.

According to the present invention, the electric power regenerated on the D-C side of the inverter, is fed to the apparatus which controls the electric motor. In this case, when the voltage on the D-C side of the inverter becomes greater than a first reference value, a first switching element is rendered conductive to supply the regenerated electric power to the control apparatus.

Therefore, there is no need of particularly providing an independent power regenerating inverter, and the apparatus can be cheaply constructed. Further, the regenerated electric power is not wastefully consumed by resistors, and the regenerated energy can be saved.

Furthermore, in case the voltage of the D-C control supply becomes greater than a second reference voltage, a second switching element is rendered conductive so that the regenerated electric power is consumed by a resistor. Therefore, the regenerated electric power can be controlled even when it is too great to be absorbed by the control apparatus alone.

In the present invention, the first and second switching elements are made of semiconductor elements connected in series similarly to the switching elements in the inverter. Therefore, respective parts thereof can be commonly utilized and can be easily interconnected.

Furthermore, when the A-C power source is interrupted, the second switching element is rendered conductive, and the smoothing capacitor in the rectifier is allowed to discharge. Therefore, the maintenance staff is not endangered of being electrifiled.

Moreover, in the present invention, a diode is connected in parallel with the first switching element, and the smoothing capacitor is electrically charged to at least the level of the control voltage. Therefore, a rush current at the time of starting the elevator is reduced so as not to adversely affect the life of the smoothing capacitor as well as any other parts.

DESCRIPTION OF THE PREFERRED EMBODIMENT

Figure 1:
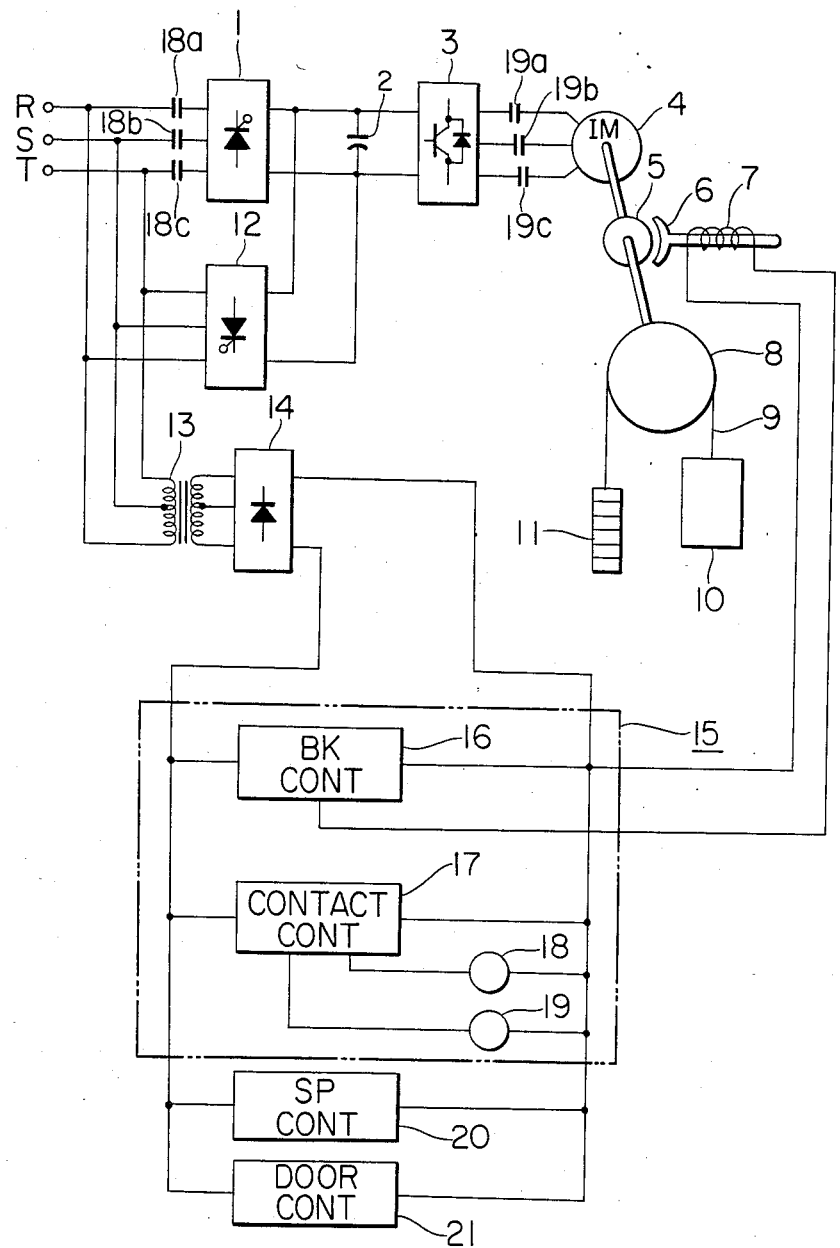
FIG. 1 is a diagram showing conventional apparatus for controlling an A-C powered elevator.

An embodiment of the invention will be described below with reference to FIGS. 2 and 3, in which the same portions as those of FIG. 1 are denoted by the same reference numerals.

Figure 2:
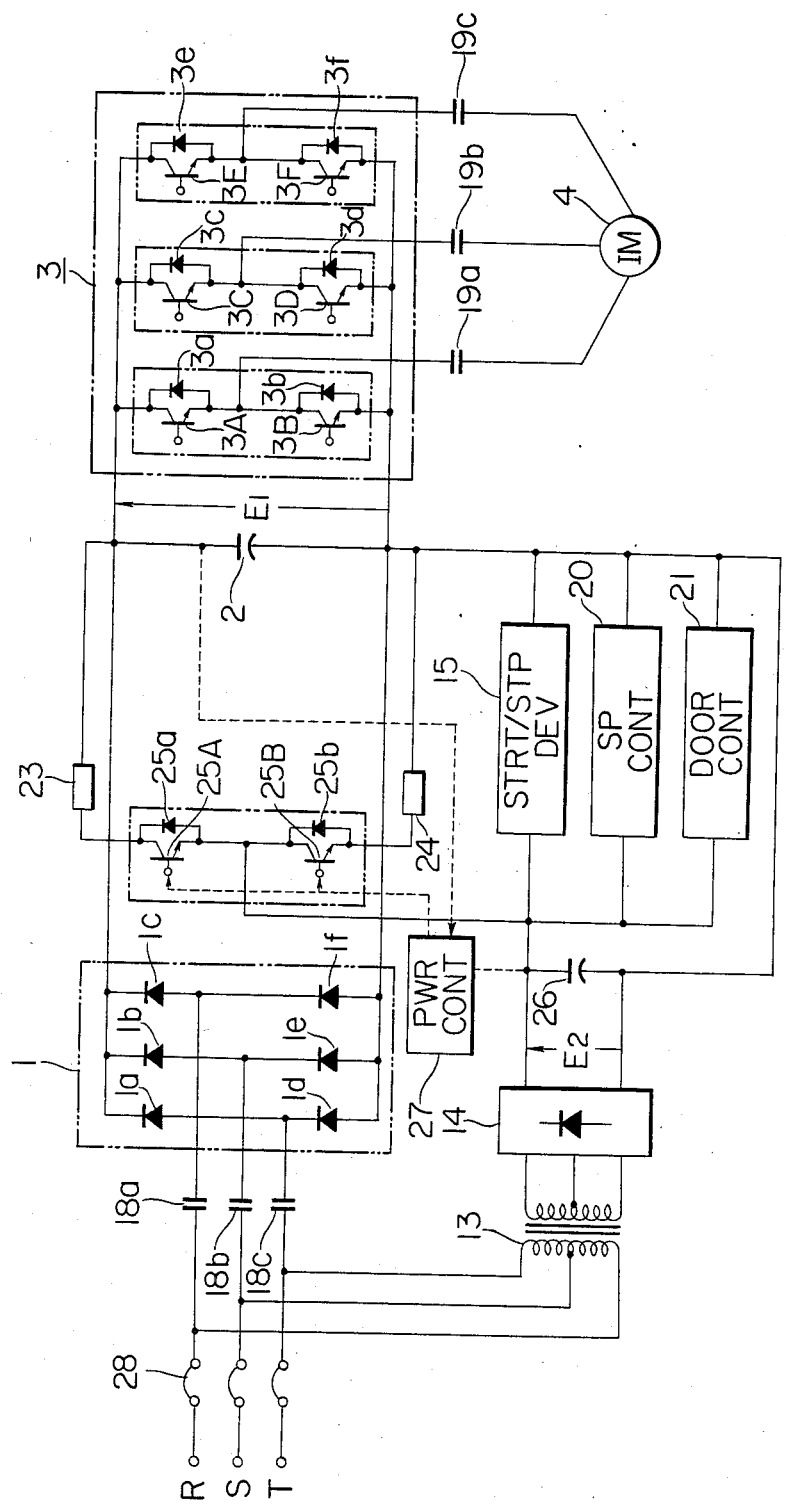
FIG. 2 is a circuit diagram of an apparatus for controlling an A-C powered elevator according to an embodiment of the present invention.

In FIG. 2, reference numerals 1a to 1f denote diodes which constitute a three-phase full-wave rectifier circuit, numerals 3A and 3B, 3C and 3D, 3E and 3F denote transistors which are respectively connected in series on the output side of the rectifier 1, numerals 3a to 3f denote diodes which are connected in parallel with the transistors 3A to 3F, respectively, numerals 23 and 24 denote resistors each having one end thereof connected to a respective terminal on the D-C side of the inverter 3, numerals 25A and 25B denote transistors which are connected in series with each other, and which are further connected to the other ends of the resistors 23 and 24.

Reference numerals 25a and 25b denote diodes that are connected in parallel with transistors 25A and 25B, respectively, numeral 26 denotes a capacitor connected to the D-C side of the rectifier 14, numeral 27 denotes a power controller which monitors a voltage $E_1$ on the D-C side of the inverter 3 and a voltage $E_2$ on the D-C side of the rectifier 14, and which controls the transistors 25A and 25B, and reference numeral 28 denotes a circuit breaker.

Figure 3:
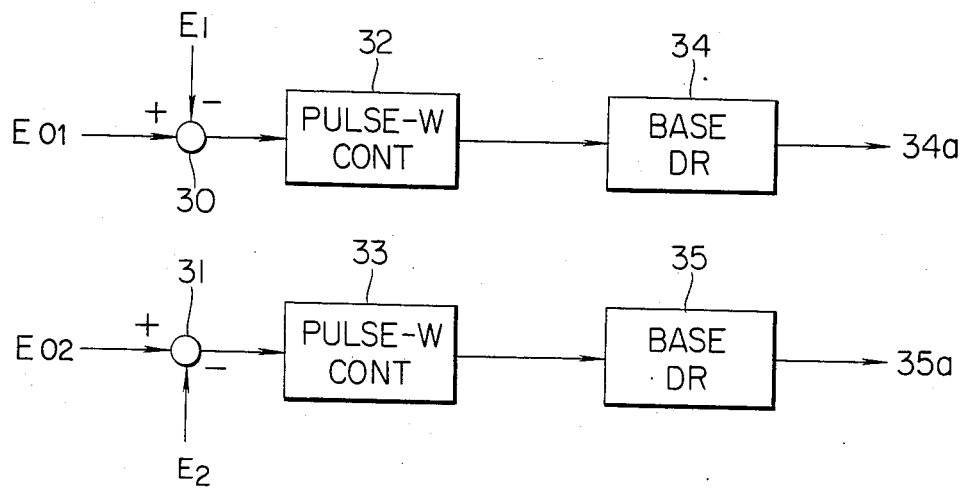
FIG. 3 is a block diagram of a power controller of FIG. 2.

In FIG. 3, symbols $E_{01}$ and $E_{02}$ denote reference voltages, numerals 30 and 31 denote adders which add reference voltages $E_{01}$ and $E_{02}$ to voltages $E_1$ and $E_2$, respectively, to calculate respective deviated voltages.

Reference numerals 32 and 33 denote pulse-width control devices consisting of widely known integrated circuit elements, which generate pulses having a ratio of "H" sections to "L" sections which vary depending upon the value of the deviated voltages from adders 30 and 31, respectively, numerals 34 and 35 having respective outputs 34a and 35a denote base drivers having power amplification functions and are utilized for controlling the on-off operation of the transistors 25A and 25B, according to the width of the pulses from the pulse width control devices 32 and 33, respectively.

The operation of the above described embodiment will be described here below.

When the electric motor 4 is in powering operation, A-C power of a variable voltage and a variable frequency is supplied from the inverter 3 to the motor 4 so that its speed is controlled as explained with reference to FIG. 1. In this case, the reference voltage $E_{01}$ has been selected to be higher than the voltage $E_1$ on the D-C side of the inverter 3. Hence, the pulse-width controller 32 does not operate and the transistor 25A is not rendered conductive. Similarly, since the reference voltage $E_{02}$ has been selected to be higher than the voltage $E_2$ on the D-C side of the rectifier 14, the pulse-width controller 33 does not operate, and the transistor 25B is not rendered conductive. Accordingly, the control power is supplied from the rectifier 14 to the controllers 15, 20 and 21.

When the motor 4 is in regenerative operation, the regenerated electric power flows into the inverter 3. As the voltage $E_1$ on the D-C side of the inverter 3 becomes higher than the reference voltage $E_{01}$, the pulse-width controller 32 produces pulses having "H" and "L" sections directly related to the difference between said voltages. The pulses are inputted to the base drivers 34 which produces a respective output 34a to drive the transistor 25A. The transistor 25A, therefore, is rendered conductive responsive to the deviated voltage. Accordingly, the regenerated electric power is supplied to the controllers 15, 20 and 21 through a circuit of 3-23-25A-15-20-21-3. As the regenerated electric power further increases causing the voltage $E_1$ to increase and consequently the voltage $E_2$ on the D-C side of the rectifier 14 to become greater than the reference voltage $E_{02}$, the pulse-width controller 33 operates and produces output 35a via the base driver 35, to render the transistor 25B conductive. Therefore, the excess regenerated electric power that could not be absorbed by the controllers 15, 20, 21 is supplied to resistors 23, 24 via the circuit of 3-23-25A-25B-24-3, and is consumed therein. Accordingly, the transistors 25A, 25B and diodes 25a, 25b serve as a controlling device for controlling the direction in which regenerated power is to flow in the system.

The inverter 3 consists, as shown in FIG. 2, of transistors and diodes connected in parallel, each diode being connected in parallel with a respective transistor each pair forming an arm. Transistors 25A, 25B and diodes 25a, 25b for controlling the regenerated electric power, are also connected in the same manner as above. This is advantageous from the standpoint of obtaining the parts and mounting the parts.

The electric charge of the capacitor 2 may be gradually discharged while the cage 10 is in a stopped position however, the capacitor 2, is electrically charged to at least the voltage $E_2$ through the diode 25a at all times. Consequently, when contacts 18a to 18c of the electromagnetic contactor are closed to start the cage 10, a reduced rush current flows, and the life of the capacitor and the diodes 1a to 1f are not adversely affected.

Figure 4:
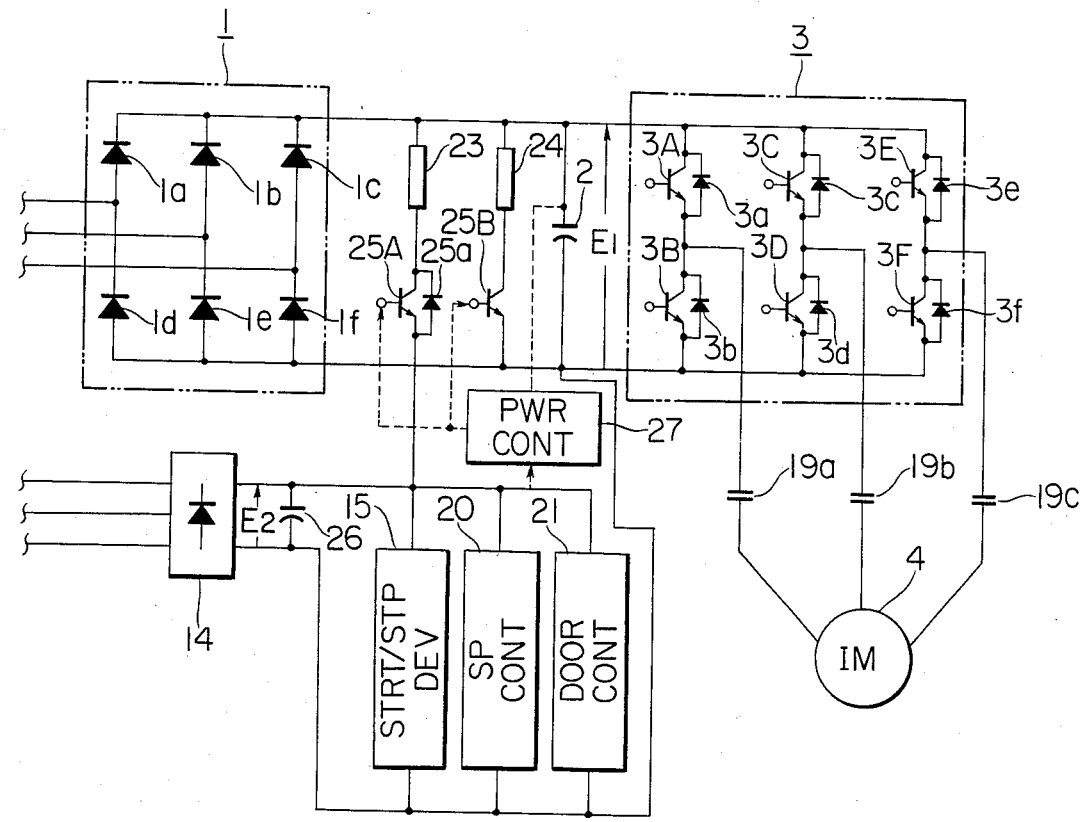
FIG. 4 is a diagram showing another embodiment of the present invention, and showing portions of FIG. 1.

FIG. 4 illustrates another embodiment of the present invention.

The resistor 23 and transistor 25A are connected in series between one end on the D-C side of the inverter 3 and one end on the D-C side of the rectifier 14, and the resistor 24 and transistor 25B are connected in series across both ends on the D-C side of the inverter 3. The circuit of FIG. 4 is the same as that of FIGS. 2 and 3 with regard to all other connections.

When the motor is in regenerative operation, the transistor 25A is rendered conductive, and the regenerated electric power is supplied to the controllers 15, 20 and 21. When the voltage $E_2$ becomes higher than the reference voltage $E_{02}$, the transistor 25B is rendered conductive by the power controller 27, so that the regenerated electric power is consumed by the resistor 24.

Figure 5:
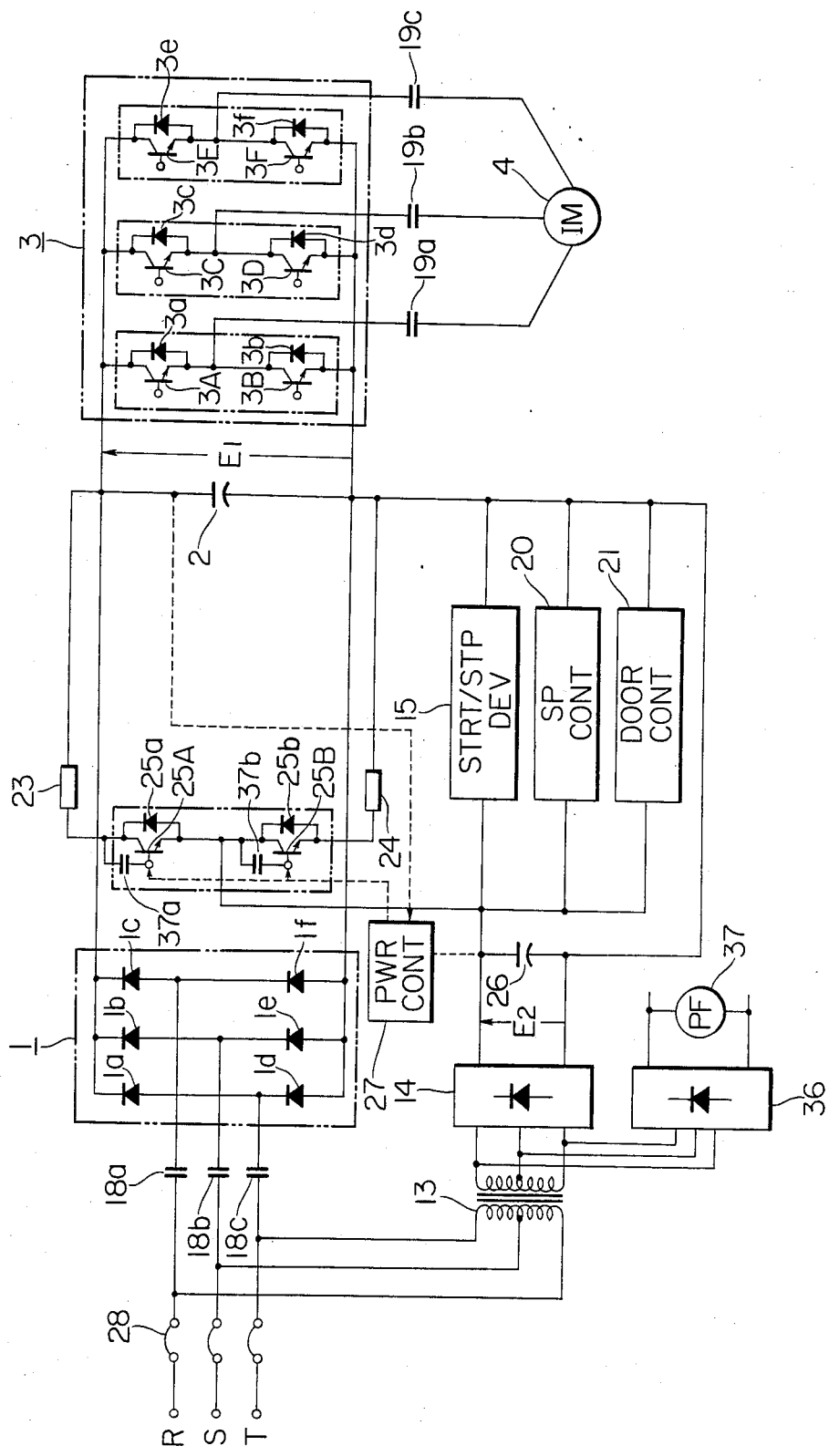
FIG. 5 is a diagram which shows a further embodiment of the present invention.

When the circuit breaker 28 is interrupted for the purpose of maintenance and checking, the electric charges stored in the capacitors 2, 26 are not quickly discharged, and a high tension is maintained on said capacitors exposing the maintenance staff to a dangerous situation. However, if the transistors 25A, 25B are rendered conductive when the circuit breaker 28 is interrupted, the capacitor 2 is discharged through the resistors 23, 24, and the capacitor 26 is discharged through the resistor 24, thereby eliminating the danger of being electrocuted. That is, as shown in FIG. 5, a relay 37 for detecting power failure is connected to the output side of a rectifier 36. Contacts 37a, 37b of the relay 37 are connected between the base and the collector of transistors 25A, 25B. When the relay 37 detects power failure or interruption of current due to the opening of the circuit breaker 28, the contacts 37a, 37b are closed to render the transistors 25A, 25B conductive, so that the capacitors 2 and 26 are discharged via resistors 23 and 24.

Figure 6:
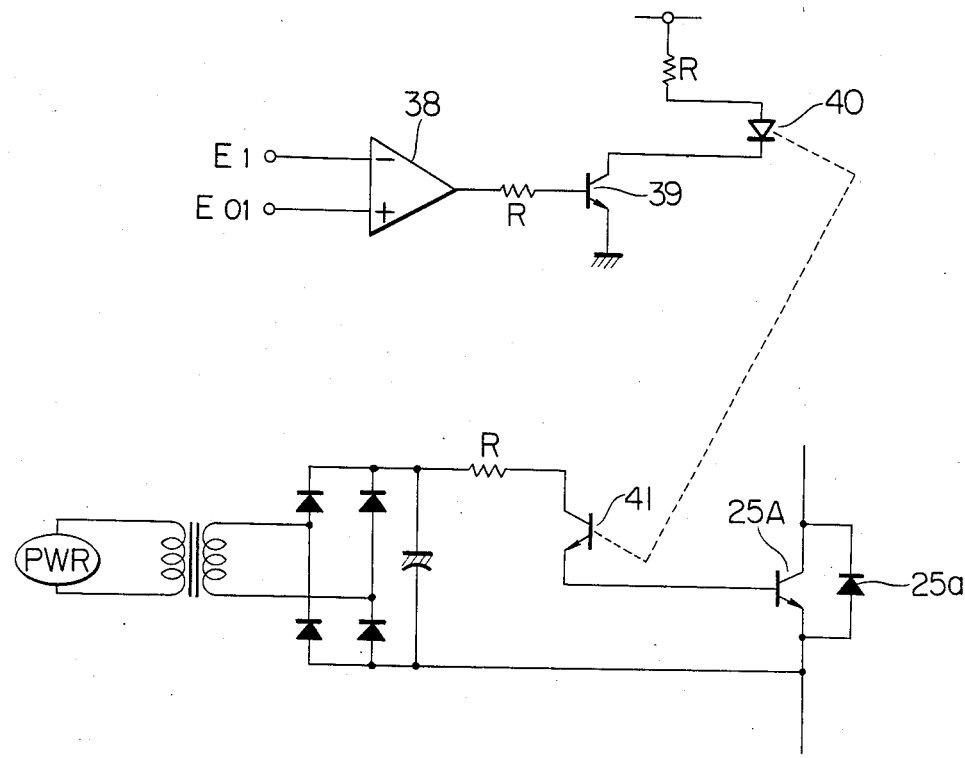
FIG. 6 is a circuit diagram illustrating the power controller according to another embodiment of the present invention.

In the embodiment of FIG. 2, the apparatus constructed as shown in FIG. 3 is used as the power controller 27. The circuit constructed as shown in FIG. 6, however, may be employed as the power controller for the embodiment of FIG. 2. Although FIG. 6 illustrates the circuit for the transistor 25A only, the circuit for the transistor 25B is also constructed in the same manner, and is not illustrated herein.

With the circuit of FIG. 6, when the voltage $E_1$ on the D-C side of the inverter 3 becomes greater than the reference voltage $E_{01}$ with the motor 4 being in the regenerative operation condition, a comparator 38 produces an output to render a transistor 39 conductive, which turns on a light-emitting diode 40 which is utilized as a photocoupler. A transistor 41 activated by the photocoupler diode 40 is turned on to render a transistor 25A conductive. Therefore, the regenerated electric power is supplied to the controllers in the same manner as described in conjunction with FIG. 2.

What is claimed is:

1. An apparatus for controlling an A-C powered elevator comprising a rectifier for converting A-C electric power to D-C electric power, an inverter connected to the rectifier for converting the D-C electric power to A-C electric power of a variable frequency, a cage, an A-C electric motor operatively associated with the cage and connected to the inverter to be driven by the variable frequency A-C electric power, the motor producing regenerated electric power depending on the operation conditions of the cage, means for controlling the A-C electric motor, a D-C source connected to the motor controlling means, and a regenerated electric power controlling device connected between the D-C side of the inverter and the motor controlling means in order to supply the regenerated electric power to the motor controlling means.

2. The apparatus of claim 1 wherein the regenerated electric power controlling device includes a power controller which produces a switching signal when the voltage on the D-C side of the inverter exceeds a reference value and a switching element which is connected between the D-C side of the inverter and the motor controlling means, is further connected to the power controller, and is rendered conductive by the switching signal in order to supply the regenerated electric power to the motor controlling means.

3. The apparatus of claim 2 wherein the regenerated electric power controlling device further includes a diode connected in parallel with the switching element.

4. The apparatus of claim 3 wherein the regenerated electric power controlling device further includes a resistor connected between the switching element and the inverter.

5. The apparatus of claim 1 wherein the regenerated electric power controlling device includes a power controller which produces a switching signal when the voltage of the D-C source exceeds a reference value, a resistor connected to the D-C side of the inverter, and a switching element which is connected via the resistor to the D-C side of the inverter, is further connected to the power controller, and is rendered conductive by the switching signal so that the regenerated electric power is consumed by the resistor.

6. The apparatus of claim 1 wherein the regenerated electric power controlling device includes a power controller which produces a first signal when the voltage on the D-C side of the inverter exceeds a first reference value and produces a second signal when the voltage of the D-C source exceeds a second reference value, a first switching element which is connected between the D-C side of the inverter and the motor controlling means, is further connected to the power controller, and is rendered conductive by the first signal in order to supply the regenerated electric power to the motor controlling means, a resistor, and a second switching element which is connected in series with the resistor to the D-C side of the inverter via the first switching element, is further connected to the power controller, and is rendered conductive by the second signal so that the regenerated electric power is consumed by the resistor.

7. The apparatus of claim 6 wherein the regenerated electric power controlling device further includes a resistor connected between the first switching element and the inverter and wherein the first and second switching elements and the motor controlling means are connected at a common point.

8. The apparatus of claim 6 wherein the inverter includes a plurality of arms connected in parallel with each other, each arm comprising a set of switching elements connected in series and diodes connected in parallel with each switching element, wherein the first and second switching elements are connected in series at a common point, and wherein diodes are connected in parallel with each of the first and second switching elements whereby the first and second switching elements and their associated diodes constitute another arm similar to the arms of the inverter.

9. The apparatus of claim 1 wherein the regenerated electric power controlling device includes a power controller which produces a first signal when the voltage on the D-C side of the inverter exceeds a first reference value and produces a second signal when the voltage of the D-C source exceeds a second reference value, a first switching element which is connected between the D-C side of the inverter and the motor controlling means, is further connected to the power controller, and is rendered conductive by the first signal so that the regenerated electric power is supplied to the motor controlling means, a resistor connected to the D-C side of the inverter, and a second switching element which is connected to the D-C side of the inverter via the resistor, is further connected to the power controller, and is rendered conductive by the second signal so that the regenerated electric power is consumed by the resistor.

10. An apparatus for controlling an A-C powered elevator comprising a rectifier for converting A-C electric power to D-C electric power, a capacitor connected to the rectifier for smoothing the D-C electric power, an inverter connected to the capacitor for inverting the smoothed D-C electric power to A-C electric power of a variable frequency, a cage, an A-C electric motor operatively associated with the cage and connected to the inverter to be driven by the variable frequency A-C electric power, the motor producing regenerated electric power depending on the operating conditions of the cage, means for controlling the A-C electric motor, a D-C source connected to the motor controlling means, a power controller which produces a switching signal when the A-C power is interrupted, a resistor connected to the D-C side of the inverter, and a switching element which is connected via the resistor to the D-C side of the inverter, is further connected to the power controller, and is rendered conductive by the switching signal so that the electric charge stored in the capacitor is consumed by the resistor.

* * * * *